(12) United States Patent
Ott

(10) Patent No.: US 9,139,111 B2
(45) Date of Patent: Sep. 22, 2015

(54) VEHICLE SEAT, IN PARTICULAR FOR UTILITY VEHICLES, WITH A SEAT PART AND A BACKREST AND FUNCTIONS THAT CAN BE USED TOGETHER

(71) Applicant: GRAMMER AG, Amberg (DE)

(72) Inventor: Richard Ott, Kuemmersbruck (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 14/109,166

(22) Filed: Dec. 17, 2013

(65) Prior Publication Data

US 2014/0339869 A1    Nov. 20, 2014

(30) Foreign Application Priority Data

Dec. 18, 2012    (DE) .......................... 10 2012 112 557

(51) Int. Cl.
| | |
|---|---|
| *B60N 2/06* | (2006.01) |
| *B60N 2/08* | (2006.01) |
| *B60N 2/14* | (2006.01) |
| *B60N 2/02* | (2006.01) |
| *B60N 2/48* | (2006.01) |

(Continued)

(52) U.S. Cl.
CPC ................ *B60N 2/146* (2013.01); *B60N 2/028* (2013.01); *B60N 2/0232* (2013.01); *B60N 2/06* (2013.01); *B60N 2/14* (2013.01); *B60N 2/4855* (2013.01); *B60N 2/502* (2013.01); *B60N 2/509* (2013.01); *B60N 2002/445* (2013.01); *B60N 2002/4425* (2013.01)

(58) Field of Classification Search
CPC ........... B60N 2/14; B60N 2/146; B60N 2/502
USPC .................................................. 297/344.24
See application file for complete search history.

(56) References Cited

U.S. PATENT DOCUMENTS

| | | | |
|---|---|---|---|
| 3,572,817 A | | 3/1971 | Colautti et al. |
| 4,570,997 A | * | 2/1986 | Tanizaki et al. .......... 297/344.24 |

(Continued)

FOREIGN PATENT DOCUMENTS

| | | |
|---|---|---|
| DE | 1116987 | 11/1961 |
| DE | 2828503 | 1/1980 |

(Continued)

OTHER PUBLICATIONS

U.S. Appl. No. 14/109,117, filed Dec. 17, 2013, Haller.

(Continued)

*Primary Examiner* — Rodney B White
(74) *Attorney, Agent, or Firm* — Sheridan Ross P.C.

(57) ABSTRACT

A vehicle seat, in particular for utility vehicles, is provided with a seat part, a backrest and a lower part, in relation to which an upper part carrying the seat part and the backrest is resiliently mounted, the seat part being rotatably mounted in relation to the upper part by means of a rotary device about a rotational axis, which extends in the height direction of the vehicle seat, for a rotary movement and being resiliently mounted for a horizontal spring movement by means of a horizontal spring device in at least one direction running perpendicularly to the rotational axis, preferably the transverse direction of the vehicle seat, wherein both the rotary device and the horizontal spring device can be locked and unlocked at the same time with respect to the movements carried out with them by means of a common switching element.

11 Claims, 5 Drawing Sheets

(51) Int. Cl.
*B60N 2/50* (2006.01)
*B60N 2/44* (2006.01)

(56) References Cited

U.S. PATENT DOCUMENTS

| | | | |
|---|---|---|---|
| 4,834,452 A * | 5/1989 | Goodrich | 297/344.24 X |
| 5,161,765 A * | 11/1992 | Wilson | 297/344.24 X |
| 5,292,179 A * | 3/1994 | Forget | 297/344.24 |
| 5,568,960 A | 10/1996 | Oleson et al. | |
| 5,704,729 A * | 1/1998 | Carnahan et al. | 297/344.24 X |
| 5,720,462 A * | 2/1998 | Brodersen | 297/344.24 X |
| 6,079,786 A * | 6/2000 | Kirkland et al. | 297/344.24 |
| 6,325,456 B1 * | 12/2001 | Carnahan | 297/344.24 |
| 6,402,114 B1 * | 6/2002 | Carnahan et al. | 297/344.24 X |
| 7,121,608 B2 * | 10/2006 | Billger et al. | 297/344.24 X |
| 7,520,567 B2 * | 4/2009 | Billger et al. | 297/344.24 X |
| 8,033,589 B2 * | 10/2011 | Kusanagi et al. | 297/344.24 X |
| 2002/0149250 A1 * | 10/2002 | Silvia | 297/344.24 |
| 2003/0189370 A1 * | 10/2003 | Hemmer et al. | 297/344.24 X |
| 2006/0226685 A1 * | 10/2006 | Priepke et al. | 297/344.24 |
| 2009/0284061 A1 * | 11/2009 | Maier et al. | 297/344.24 |
| 2010/0001169 A1 | 1/2010 | Arm et al. | |
| 2011/0074198 A1 * | 3/2011 | Iwasaki et al. | 297/344.24 |
| 2015/0015039 A1 * | 1/2015 | Brand et al. | 297/344.24 X |
| 2015/0035334 A1 * | 2/2015 | Roth et al. | 297/344.24 |

FOREIGN PATENT DOCUMENTS

| | | |
|---|---|---|
| DE | 3127625 | 6/1982 |
| DE | 3708399 | 9/1987 |
| DE | 4415933 | 11/1994 |
| DE | 69721383 | 3/2004 |
| DE | 60118068 | 8/2006 |
| DE | 202006010184 | 9/2006 |
| DE | 102007021141 | 9/2008 |
| EP | 1659021 | 5/2006 |
| EP | 1824358 | 8/2007 |
| EP | 2293959 | 3/2011 |
| GB | 525663 | 9/1940 |
| JP | H10-217811 | 8/1998 |
| JP | 2003-063288 | 3/2003 |
| JP | 2004-203160 | 7/2004 |
| KR | 10-2013-0056092 | 5/2013 |
| WO | WO 2004/056605 | 7/2004 |
| WO | WO 2007/028473 | 3/2007 |

OTHER PUBLICATIONS

U.S. Appl. No. 14/109,425, filed Dec. 17, 2013, Haller.
U.S. Appl. No. 14/109,493, filed Dec. 17, 2013, Haller.
U.S. Appl. No. 14/109,540, filed Dec. 17, 2013, Haller.
Extended European Search Report (no English translation available) for European Patent Application No. 13197100.4 dated Jun. 3, 2015, 6 pages.

* cited by examiner

VEHICLE SEAT, IN PARTICULAR FOR UTILITY VEHICLES, WITH A SEAT PART AND A BACKREST AND FUNCTIONS THAT CAN BE USED TOGETHER

CROSS-REFERENCE TO RELATED APPLICATIONS

This application claims the benefit of German Application No. 10 2012 112 557.0 filed Dec. 18, 2012, the disclosure of which is incorporated herein by reference.

DESCRIPTION

The invention relates to a vehicle seat, in particular for utility vehicles, with a seat part, a backrest and a lower part, in relation to which an upper part carrying the seat part and the backrest is resiliently mounted, the seat part being rotatably mounted in relation to the upper part by means of a rotary device about a rotational axis, which extends in the height direction of the vehicle seat, for a rotary movement and being resiliently mounted by means of a horizontal spring device in at least one direction running perpendicularly to the rotational axis, preferably in the transverse direction of the vehicle seat, for a horizontal spring movement, according to the preamble of claim 1.

Vehicle seats with rotary devices are known just as well as vehicle seats with horizontal spring devices. Rotary devices, which are frequently arranged in or on the upper part of a vehicle seat are used here to be able to rotate the vehicle seat about its vertical axis, in order, for example, to allow the user of a tractor to be able to better turn to the rear in a rotational position of the seat, which differs from the conventional direction-of-travel sitting position, which is oriented to the front. This means that he can better observe the apparatuses coupled and fastened to the tractor and the cultivated farmland. Rotary mechanisms of this type can also be used to make it easier for the user to climb on and off the vehicle, as the accesses to the cabins of utility vehicles, in particular tractors or construction vehicles, are arranged on the side of the vehicle or the cabin.

Horizontal spring devices for vehicle seats are also known, which may, for example, also be arranged in the upper part of the vehicle seat. Horizontal spring devices of this type may, for example, have at least two rails, which extend in the transverse direction of the vehicle seat, these rails mounting plate-like elements located on top of one another so as to be slidable in relation to one another and, by means of a spring tension, causing the vehicle seat to return to its centre position after a resilient deflection has taken place. Spring devices of this type for horizontal spring devices are known with different degrees of hardness.

It is also known that horizontal spring devices of this type are lockable, in other words the vehicle seat adopts a centre position with respect to the transverse direction of the vehicle seat, in other words is oriented in the longitudinal direction of the vehicle or the longitudinal direction of the vehicle seat and is positioned in the centre with respect to the transverse direction of the vehicle seat.

In devices of this type, even when they are spring-loaded, it has been shown that in order to adopt an original position or a centre position again, during the transition from travelling on a field to travelling on a road or vice versa, locking or unlocking of individual devices by the driver is simultaneously desired. However, a large number of actuating elements previously had to be actuated in order to lock/stop or unlock more than one device. The locking and/or unlocking state in various devices, such as a rotary device and a horizontal spring device, is frequently also different, depending on the terrain, which is currently being traveled on by the utility vehicle; in other words, there are state situations in which one device is to be present locked and the other device is to be present unlocked. Therefore, in this case, too, a large number of actuating elements have to be handled in order to bring about the desired state of the vehicle seat.

Accordingly, it is the object of the invention to provide a vehicle seat, in particular for utility vehicles, with a seat part and a backrest as well as a lower part, in relation to which an upper part carrying the seat part and the backrest is resiliently mounted, in which a large number of functional devices, such as, for example, a rotary device for rotating the vehicle seat and a horizontal spring device for carrying out a resilient movement in the horizontal direction, can easily be switched over with respect to their states.

This object is achieved according to the features of claim 1.

The core idea of the invention is that, in a vehicle seat, in particular for utility vehicles, with a seat part, a backrest and a lower part, in relation to which an upper part carrying the seat part and the backrest is resiliently mounted, the seat part being rotatably mounted in relation to the upper part by means of a rotary device about a rotary axis, which extends in the height direction of the vehicle seat, for a rotary movement, and being resiliently mounted by means of a horizontal spring device in at least one direction running perpendicularly to the axis of rotation, preferably in the transverse direction of the vehicle, for a horizontal spring movement, both the rotary device and the horizontal spring device are lockable or unlockable at the same time with respect to the movements carried out by them by means of a common switching element.

By providing a single switching element for the simultaneous implementation of states of a plurality of functional devices of the vehicle seat, simple operation of the vehicle seat can be provided during the transition from the farmland to the road or the field path as the subsurface to be traveled on or vice versa. For example, when travelling on farmland to cultivate it, the unlocking of the rotary device is often desired, in other words an—optionally spring-loaded—rotary movement of the vehicle seat, for example by +/−30 degrees is aimed for relative to the longitudinal direction of the vehicle in order to allow the rear region of the tractor to be observed, which represents the cultivated area of the farmland. On the one hand, the necessary freedom of movement is produced from a possible rotary movement of this type of the vehicle seat and, on the other hand, a facilitated observation to the rear is produced.

Likewise, when travelling on farmland, an unlocked state of the horizontal spring device is desired, as a higher vibration comfort, including in the lateral or horizontal direction, is also desired on the bumpy subsurface, such as is present on farmland.

In contrast to this, when travelling on a road, for example after having cultivated arable land, a locking state of the rotary device is desired simply because this allows an increase in travelling safety, as the driver can—when a rotary movement of the vehicle seat is prevented—reliably reach the brake pedal and the steering wheel to steer the vehicle because of its fixed orientation in the direction of travel.

Likewise, a locked state of the horizontal spring device at the position of its centre position with respect to the vehicle seat width direction is desired when travelling on a road. The driver's and the vehicle's travelling safety is also achieved by the brake pedal and the steering wheel being reached better and more reliably.

Thus, the locked state of the vehicle seat with respect to the rotary device represents an orientation of the driver in the direction of travel. A locked state of the horizontal spring device brings about a positioning of the vehicle seat in its vehicle seat width direction in a centre position and a fixing in this centre position.

The switching element, in addition to this, is in a position to switch a folding device, so as to be locked or unlocked, to carry out a folding movement of an upper part of the backrest at the same time as the rotary device and the horizontal spring device. This is an upper portion of the backrest, which is readily folded over to the rear, in other words also toward the back of the backrest in order to make it easier for the driver to turn round when cultivating farmland.

Thus a locked state of the folding device is a state in which the upper part of the backrest is oriented in the longitudinal direction of the backrest and is also set upright in this state. This locked state should be adopted when travelling on a road in order to allow a high degree of comfort here including the shoulder and head region, and support of the shoulder region. In contrast to this, the upper part of the backrest, which may also be a headrest, should be folded over when travelling on farmland in order to allow the necessary freedom of movement of the driver, also for viewing to the rear.

A vertical spring device to carry out a vertical spring movement of the upper part in relation to the lower part can additionally be switched over using the switching element at the same time as the locking/unlocking of the rotary device and the horizontal spring device. A vertical spring device of this type, as is frequently provided by means of a damper and/or a pneumatic spring, can be adjusted with respect to its damping force in such a way, that in a locked state of the rotary device and the horizontal spring device, a first vertical suspension state with a soft suspension is adopted at the same time and, in an unlocked state of the rotary device and the horizontal spring device, a second vertical suspension state with a hard suspension of the vertical spring device is adopted at the same time. Dampers, which allow a switch to be made from a soft to a hard suspension, are adequately known from the vehicle seat sector.

Consequently, a soft suspension or a soft adjustment of this vertical spring device when travelling on a road is desired in order to allow the high degree of vibration comfort. In contrast to this, when travelling on farmland, in other words in off-road areas, a hard suspension is frequently desired as this avoids unnecessary reaching of end stops of the damper and/or of the pneumatic spring.

Therefore, by actuating only one switching element, an increase in the operating convenience during a transition from off-road travel to road travel is possible. This can also be made possible the other way round, as a single actuation of a switching element at the same time and immediately changes a plurality of states of the vehicle seat and therefore a plurality of different seat adjustments. This results in adequate time being available for the actual cultivation process for the farmland.

Moreover, the driver does not unnecessarily have to give attention and time to the adjustment of the vehicle seat during the transition from the road to the off-road area and the other way round.

By actuating this single switch, already pre-programmed seat adjustments that have previously been adjusted by the driver, for example by means of programming, can also be restored. As a result, a restoration of an optimal seat function adjustment can thus be achieved. Furthermore, a high degree of freedom of movement is made possible, as, in the unlocked state, many degrees of freedom of the vehicle seat can be present. However, at the same time, the travelling safety of the driver within the utility vehicle, such as a tractor, is ensured on the road.

All the devices for movements of the vehicle seat can be connected both mechanically, such as, for example, by means of a cable pull and electrically, electromagnetically or pneumatically to the common switching element, and also actuated.

In addition, a seat part side support device to carry out an upward and downward movement of first side support elements arranged laterally on the seat part can be locked or unlocked by means of the switching element at the same time as the locking/unlocking of the rotary device and the horizontal spring device. The seat part side support device in a locked state of the rotary device and the horizontal spring device is in a state here with upwardly directed or downwardly directed first side support elements and, in an unlocked state of the rotary device and the horizontal spring device, in a state of the upwardly or downwardly directed first side support elements. This means that the side support elements, which can be attached laterally to the seat part within a cushion, can be raised or lowered, depending on whether, when travelling on the road, a high degree of travelling safety (raised state) or a high degree of freedom of movement (lowered state) is desired.

This also applies to the off-road region, in other words travelling on farmland, as the side support elements in the seat part can be lowered in order to allow the driver, who would also like to turn to the rear, a high degree of movement. Alternatively, it may purposely be provided that the side support elements are moved up in order to have given the driver a lateral support in the terrain in which the tractor is swinging back and forth.

In addition, a backrest side support device to carry out a person's body adaptation movement by second side support elements arranged laterally on the backrest can additionally be locked or unlocked by means of the switching element at the same time as the locking/unlocking of the rotary device and the horizontal spring device. This means that the backrest side support device in a locked state of the rotary device and the horizontal spring device is present in a state with downwardly directed second side support elements and, in an unlocked state of the rotary device and the horizontal spring device, is present in a state with upwardly directed second side support elements.

Thus, when travelling on the road, the necessary freedom of movement is desired in the backrest region. When travelling on farmland (off-road), on the other hand, a change in these second side support elements toward the body of the driver is desired in such a way that a body adaptation of the backrest takes place and therefore a lateral support of the driver on the terrain occurs.

According to a preferred embodiment, from a predetermined speed of the vehicle, a display device can be activated by means of a control device, by means of which display device an indication of an actuation that is due of the switching element can be displayed. This may, for example, take place at a speed of 20 km/h as a warning signal or as an indication on a display on the dashboard of the tractor, such as, for example, the display of a red safety lever or the like.

Further advantageous embodiments emerge from the subclaims.

Advantages and expediency are to be inferred from the following description in conjunction with the drawings, in which.

Figure 1:
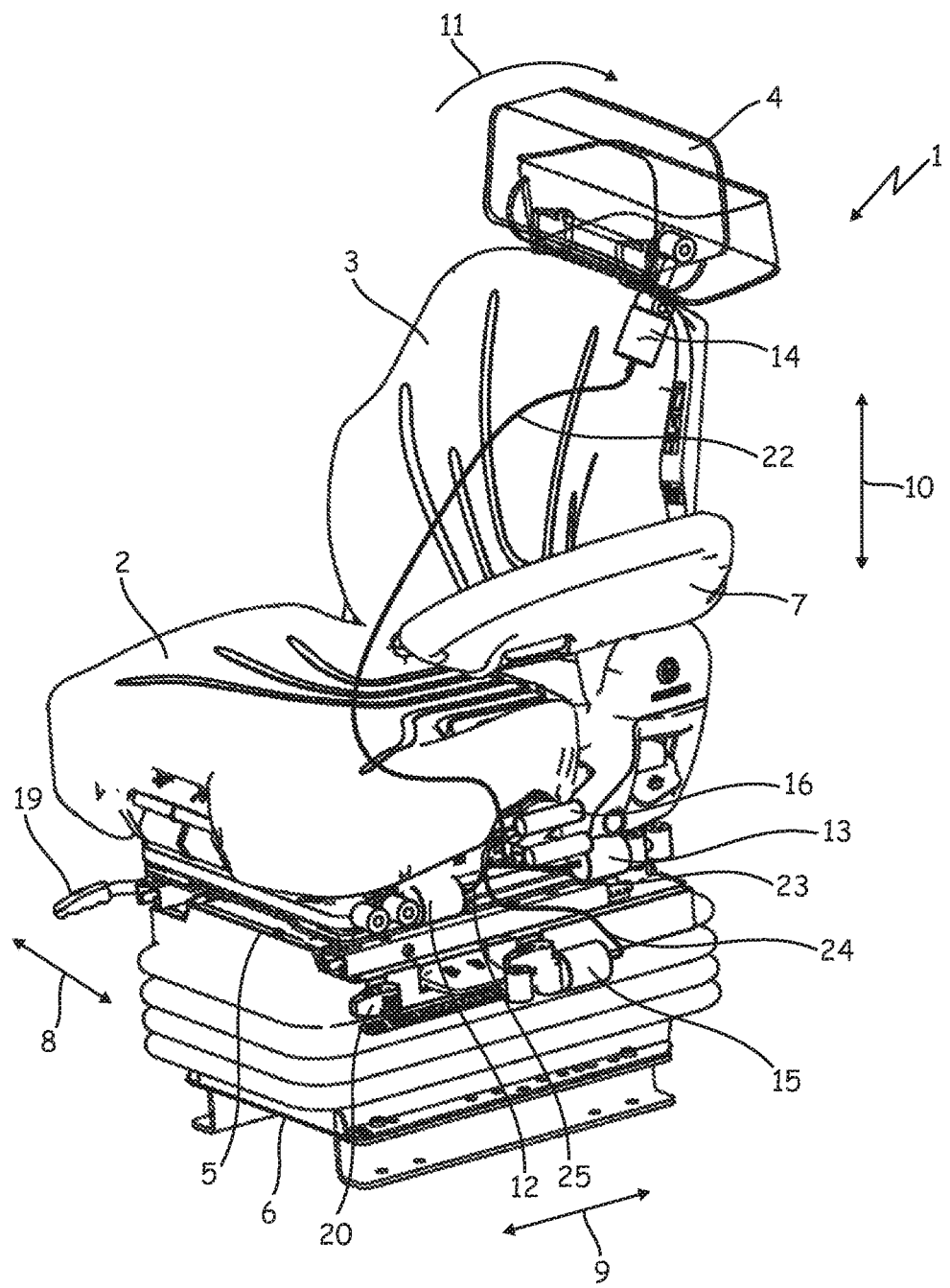
FIG. 1 shows a perspective schematic view of a vehicle seat according to the present invention with states of the seat adjustment devices shown only schematically, such as, for example, a rotary device or a horizontal spring device.

FIG. 1 shows a perspective view of a vehicle seat according to the present invention with schematically shown states of the individual seat adjustment devices. The seat adjustment devices are, for example, a rotary device for rotating the vehicle in relation to a rotational axis running substantially vertically about a horizontal spring device for the resilient horizontal movement of the vehicle seat, preferably in the width direction of the seat but also in a longitudinal direction of the seat; a vertical suspension device, which resiliently mounts an upper part in relation to a lower part of the vehicle seat; a backrest folding device, which allows an upper part of the backrest to fold over in order to thus increase the freedom of movement of the driver; a seat part side support device to extend and retract laterally arranged first side support elements on the seat part; and a backrest side support device to extend and retract laterally attached second seat support elements on the backrest.

A vehicle seat 1 comprises a seat part 2 and a backrest 3 and an upper part 4 of the backrest 3, which can also be configured as a headrest and can be folded to the rear in accordance with a movement as indicated by the arrow 11.

An upper part 5, on which the seat part 2 is arranged, is resiliently mounted in relation to a lower part 6, which is generally connected to the body base or the cabin base of a utility vehicle. A suspension of this type is covered by the bellows shown here.

The vehicle seat can be moved so as to swing or in a resilient manner both in the height direction according to the double arrow 10 and in the longitudinal direction according to the double arrow 9 and in the width direction according to the double arrow 8.

Figure 1A:
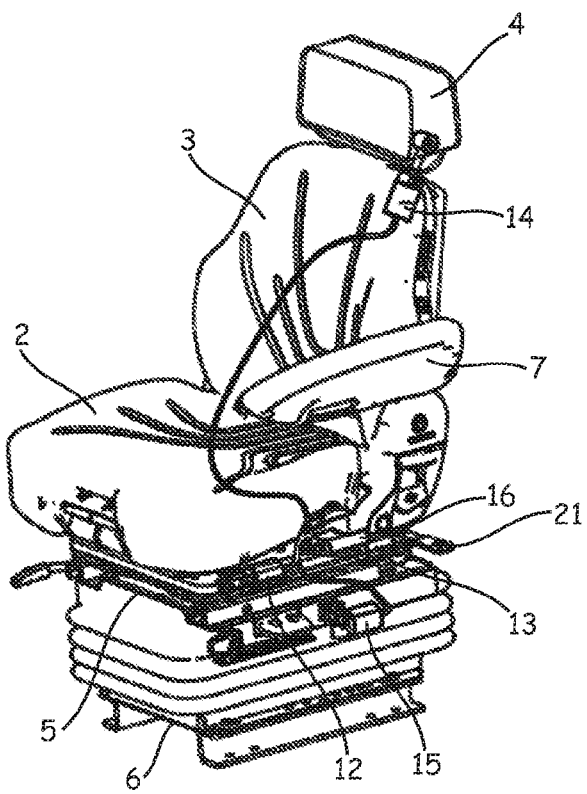
FIG. 1a shows the vehicle seat shown in FIG. 1 in a first state, in which the utility vehicle is travelling on a road.

Various schematically shown adjusting cylinders or adjusting motors 12, 13, 14, 15 are actuated together at the same time by a lever 16 and can thus bring about different seat adjustment functions. The lever 16, shown in two different positions here, can be present in a lower position in order—as shown in FIG. 1a—to bring about the state "road travel". Or the switching element or the lever 16 is in an upper position in order to bring about the state "farmland travel" according to FIG. 1b.

Figure 1B:
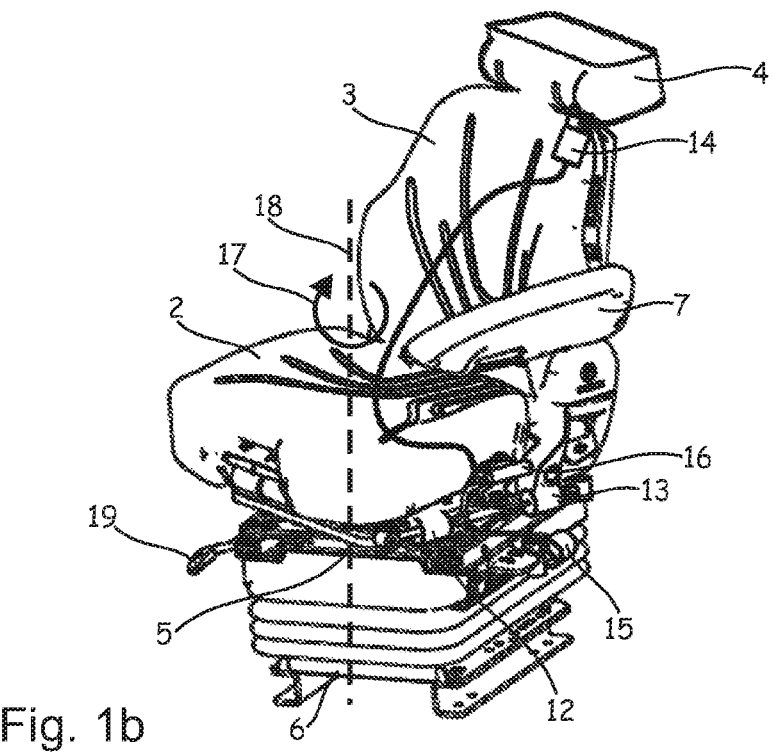
FIG. 1b shows the vehicle seat shown in FIG. 1 in a second state, in which the utility vehicle is travelling on farmland.

From viewing FIGS. 1, 1a and 1b together, it emerges that the vehicle seat can be moved about a rotational axis 18, which extends substantially vertically, by means of a rotary movement 17 with its seat part 2 within the upper part 5. This can be clearly inferred from FIG. 1b. For this purpose, the adjusting cylinder 12 of the schematic view of the mode of functioning is necessary, inter alia.

All the adjusting cylinders or motors 12, 13, 14 and 15 are connected by means of cable connections, in this case electrical cable connections 22, 23, 24 and 25 to the common switching element 16, so the switching element 16, when actuated, as occurs during the transition from travelling on a road according to FIG. 1a to travelling on farmland according to FIG. 1b, at the same time brings about all the seat adjustment functions.

According to FIG. 1b, which shows the vehicle seat in a state of travelling on farmland, the vehicle seat can thus be rotated about the rotary device. In addition, a horizontal suspension, such as can be brought about by the adjusting cylinder or the motor 13, is not locked, but unlocked.

In addition, the upper part 4 according to the arrow 11 is folded to the rear. This is brought about by the adjusting cylinder or motor 14.

Moreover, a hard suspension adjustment of the vertical damper device is adjusted by means of the adjusting cylinder or motor 15.

All the seat adjustment functions mentioned in conjunction with FIG. 1 are changed by actuating the switching element 16 once, when, for example, the travelling state of the utility vehicle changes from "farmland travel" to "road travel". The rotary device would then be locked, specifically in such a way that the vehicle seat remains oriented in the longitudinal direction 9 of the vehicle seat. In addition, this side horizontal spring device would be locked in a centre position, so the vehicle seat could not spring to the left or right. In addition, the upper part 4 of the backrest is raised to increase the travelling safety. In addition, the vertical suspension adopts a soft adjustment for comfortable travelling on the road.

The reference numeral 19 shows a lever for actuating a forward and backward displacement of the seat part 2 in relation to the lower part 6 with the upper part 5.

The switching element 20 is used to adjust a longitudinal horizontal suspension, which is not described in more detail here.

The switching element 21 is a lever, which is triggered or moved back by means of the adjusting cylinder 13 in order to unlock or lock the side horizontal lock.

Figure 2:
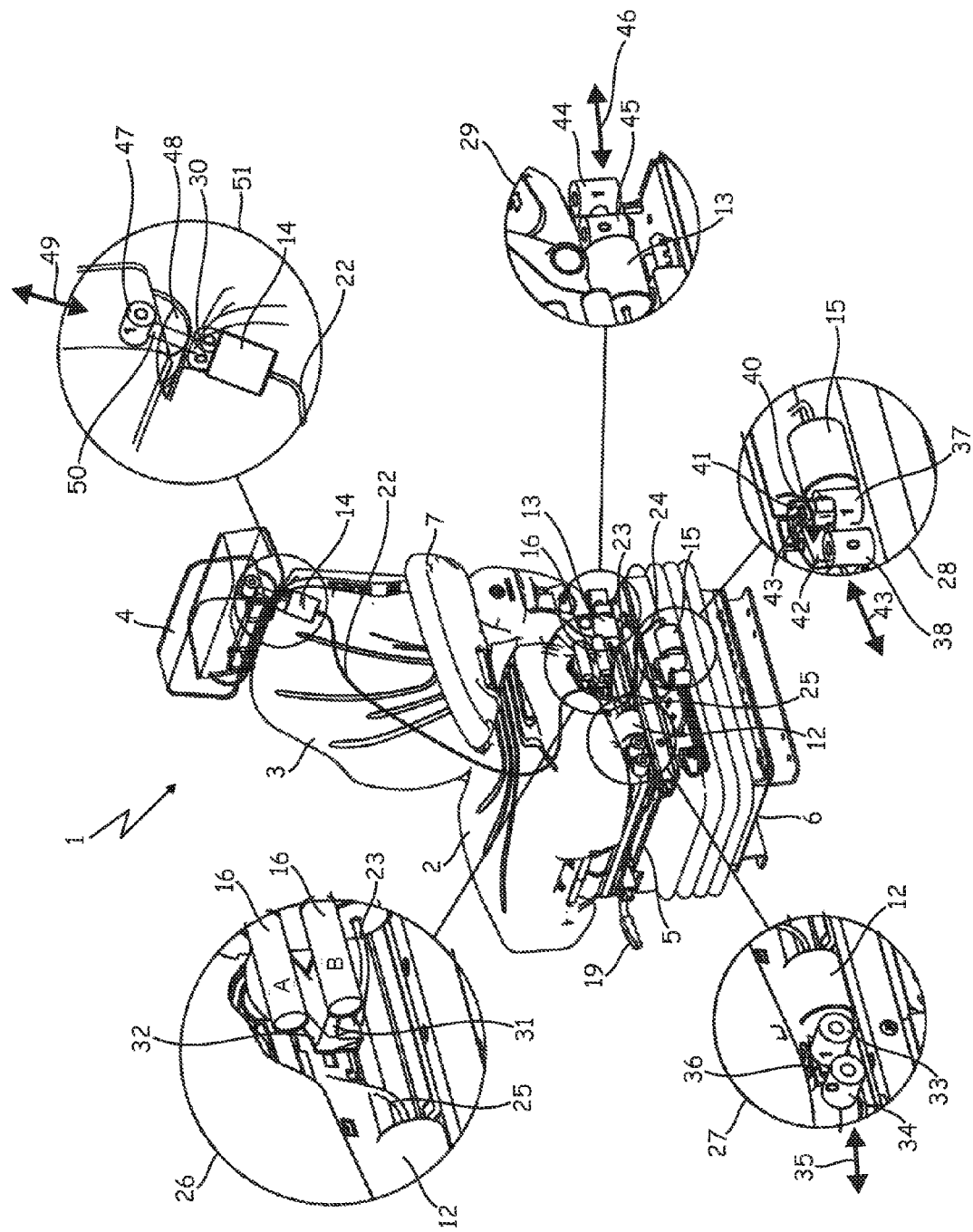
FIG. 2 shows a perspective view of the vehicle seat shown in FIGS. 1, 1a and 1b with enlarged seat cutout views, which schematically show various states of the seat adjusting devices.

The vehicle seat shown in FIG. 1 is represented in FIG. 2 by schematically shown states of the individual seat adjustment devices. It can be inferred from this view that, according to the five enlarged cutout views 26, 27, 28, 29 and 30, various states of the devices and also of the switching element 16 are possible.

According to reference numeral 26, two different positions of the switching element 16 are represented in an enlarged view. In a position A, the state "farmland travel" is adopted by the various seat adjustment devices. This is brought about by the element 16 for all the seat adjustment devices. In the state B, the seat adjustment devices adopt the state that is necessary to bring about the state "road travel".

It can also be inferred from the view according to reference numeral 26 that the individual connection lines 23, 25 lead to the switching element 16.

According to the enlarged cutout view 27, two different switching states 34 and 33 of the adjusting cylinder 12, which is responsible for the rotary device and therefore for a rotary movement of the seat part in relation to the lower part 6, are shown. The adjusting cylinder 12 can retract and extend a piston according to the double arrow 35 and thus adopt a locked state (reference numeral 33), in which a rigid connection, not shown in more detail here, takes place between the piston or a part 33 and a component 36 connected to the rotary device, and an unlocked state according to reference numeral 34.

An enlarged view of the vertical spring device in two different states is represented according to reference numeral 28. In a locked state according to reference numeral 37, a lever 41 is in a first position, in which a hard or soft suspension is present and in a second position 42 of the lever, as is brought about by the state 43, the adjusting cylinder 15 being able to retract and extend a piston according to the double arrow 38, the opposite suspension is accordingly adjusted in the vertical direction, in other words hard or soft. For this, the lever 41 carries out a rotary movement according to the arrow 40 about the axis 39.

In the enlarged cutout view according to reference numeral 29, two different states of the horizontal spring device are shown. In a first state 44, a locked state of the horizontal spring device is present owing to deflection of the lever 21, not shown in more detail here. For this purpose, the piston is extended or retracted according to the double arrow 46 of the adjusting cylinder 13. In a second retracted state of the piston, an unlocked state of the horizontal spring device is present.

In the enlarged cutout view according to reference numeral 30, the folding device for the upper part 4 of the backrest, which can also be configured as a headrest, is represented. It can be inferred from this view that the adjusting cylinder 14 with the extended piston 50 in a first state 47 along the direction 49 adopts a stopped or locked state and therefore the upper part 4 is oriented so as to be raised in the direction of the longitudinal direction of the backrest. In a second state 48, the piston 50 is retracted and thus allows a pivoting of the part 51 and therefore a folding of the upper part 4 to the rear.

Figure 3A:
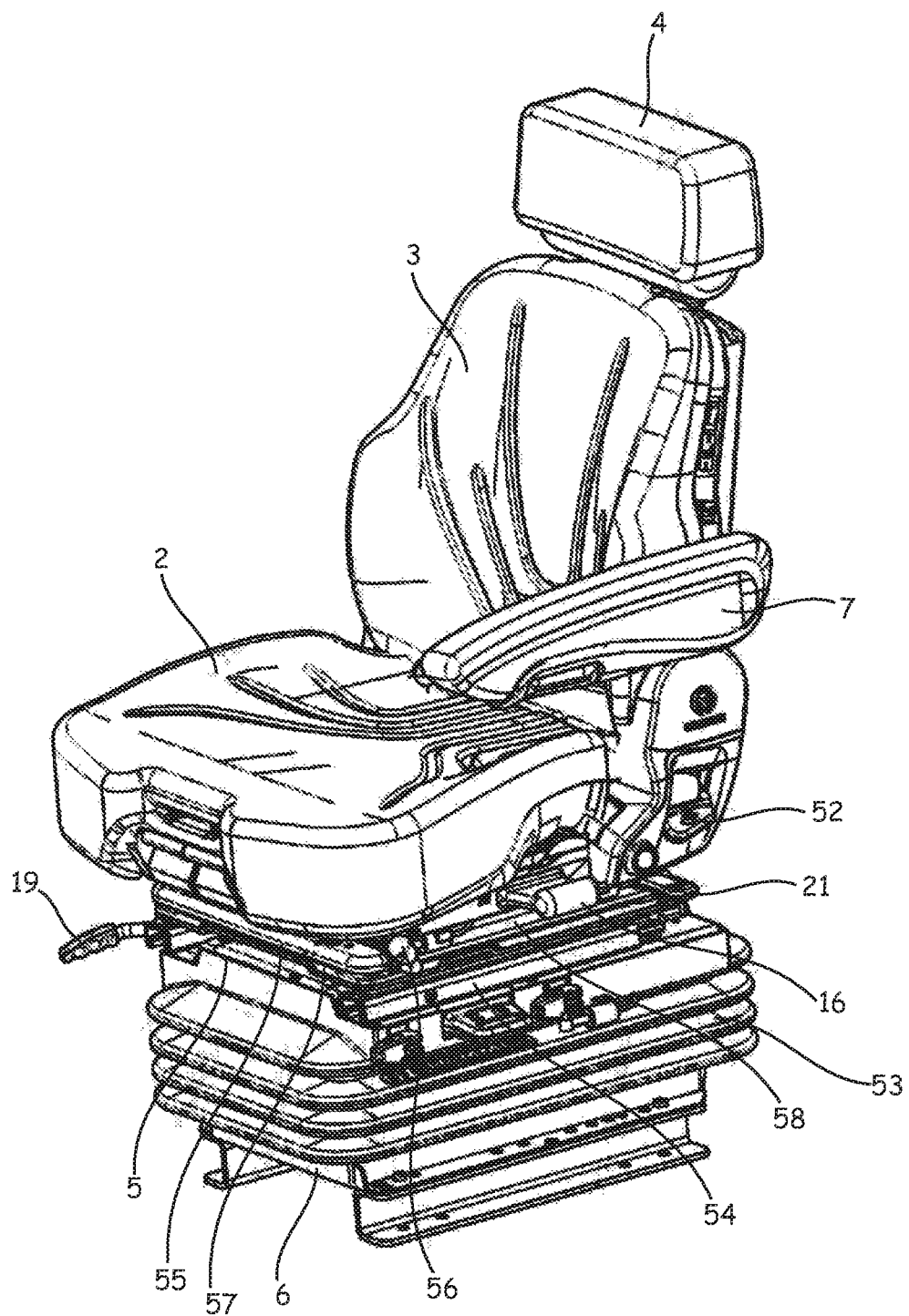
FIGS. 3a and 3b show a vehicle seat in a perspective view according to the present invention, in a complete and cutout form, which shows the individual elements of the seat adjustment devices in more detail.
Figure 3B:
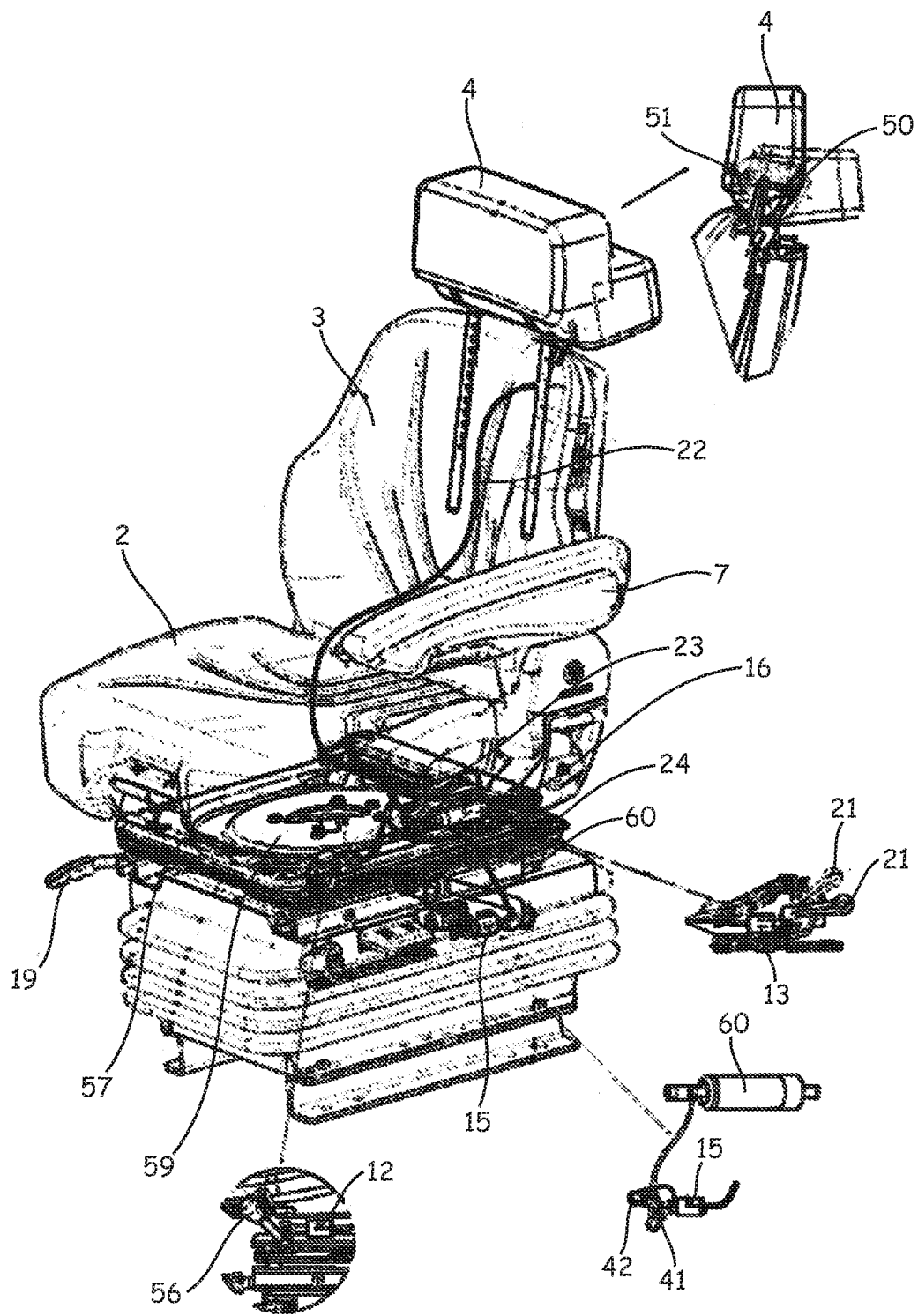

FIGS. 3a and 3b show the vehicle seat according to the present invention with a detailed view with various adjusting devices. The various seat adjustment devices can, in particular, be inferred from the view according to FIG. 3b, which represents a partially cutout view of the vehicle seat.

On closer observation of the vehicle seats represented in FIGS. 3a and 3b, it can be seen that rail elements 54 running in the longitudinal direction are used to displace the vehicle seat or the seat part 2 in the forward and backward direction, in other words in the longitudinal direction 9 of the vehicle. Likewise, rail elements 55 running in the width direction of the vehicle can be seen, which are necessary for a lateral displacement of the seat part in relation to the remaining upper part 5 and the lower part 6. This accompanies the function of the horizontal spring device in the width direction of the vehicle seat.

The bellows 53 are used to cover many elements, which are arranged between the upper part 5 and lower part 6.

The upper part comprises a lower plate-like element 57 and an upper plate-like element 58, which are connected to one another by means of a so-called rotary adapter 59 and can be rotated with respect to one another on the basis of ball bearings. As a result, the seat part 2 and also the backrest 3 can be rotated with respect to the lower part 6 but also the lower components of the upper part 5.

In accordance with reference numeral 52, it is possible to pivot the backrest 3 backward and forward with respect to the seat part 2 by means of a lever.

The rotary device 57, 58 and 59 can be actuated by means of a lever 56, which can in turn be brought by means of an adjusting cylinder 12 into a locked or unlocked position. This is brought about by the common switching element 16. This lever 56 is represented in two different positions in an enlarged view in FIG. 3b.

Likewise, an enlarged view of a damper element 60 and the associated adjusting cylinder 15 is represented in FIG. 3b, the adjusting cylinder 15 being used to bring the lever element 41, 42 into two different positions, so that a varyingly strong suspension (weak-strong, soft-hard) can thereby be adjusted within the damper element for the vertical damping of the vehicle seat. This seat adjustment device is also initiated by actuating the switching element 16 once.

In addition, the lever 21 for unlocking or locking a side horizontal spring device is represented in an enlarged view. This lever 21 is brought by the adjusting cylinder 13 into two different positions, as clearly emerges from the enlarged view in FIG. 3b. This function is brought about by the switching element 16.

In addition, the folding device in the upper part of the backrest can be stopped or not stopped or locked or unlocked by means of the folding mechanism, shown schematically here, in accordance with the piston 50 and the component 51.

LIST OF REFERENCE NUMERALS 1 vehicle seat
2 seat part
3 backrest
4 upper part
5 upper part
6 lower part
7 armrest
8 double arrow
9 double arrow/longitudinal direction of the vehicle
10 double arrow
11 movement arrow
12 adjusting cylinder/motors
13 adjusting cylinder/motors
14 adjusting cylinder/motors
15 adjusting cylinder/motors
16 adjusting element/lever
17 rotary movement
18 rotational axis
19 lever
20 switching element
21 switching element
22 lever
23 electric cable connection
24 electric cable connection
25 electric cable connection
26 electric cable connection
27 cutout view
28 cutout view
29 cutout view
30 cutout view
31 cutout view
33 locked state
34 locked state
35 double arrow
36 double arrow
40 arrow
41 lever element
42 lever element
44 locked state
45 first state
46 double arrow
47 first state
49 direction
50 piston
51 piston
52 component
53 bellows
55 rail element
57 upper plate-like element
58 lower plate-like element
59 rotary adapter
60 rotary device

What is claimed is:

1. A vehicle seat, comprising:
   a seat part;
   a backrest;
   a lower part which is generally interconnected to a base of a vehicle; and
   an upper part resiliently mounted in relation to the lower part, the upper part carrying the seat part and the backrest, wherein the seat part is rotatably mounted in relation to the upper part by means of a rotary device about a rotational axis which extends in the height direction of the vehicle seat for a rotary movement, wherein the seat part is resiliently mounted to carry out a horizontal spring movement by means of a horizontal spring device which is embodied as a horizontal suspension device in at least one direction running perpendicularly to the rotational axis, and wherein both the rotary device and the horizontal spring device can be locked and unlocked at the same time and immediately with respect to the rotary movement and the horizontal spring movement carried out with the rotary device and the horizontal spring device by means of a common switching element.

2. The vehicle seat according to claim 1, wherein with the vehicle seat in a locked state with respect to the rotary device the vehicle seat is oriented in the direction of travel and, in a locked state with respect to the horizontal spring device is positioned in a central position with respect to a transverse direction of the vehicle seat.

3. The vehicle seat according to claim 1, wherein a folding device, to carry out a folding movement of an upper part of the backrest, can additionally be locked or unlocked at the same time as the rotary device and the horizontal spring device by means of the switching element.

4. The vehicle seat according to claim 3, wherein the upper part of the backrest in a locked state of the folding device is oriented with an upright position in the longitudinal direction of the backrest.

5. The vehicle seat according to claim 1, wherein a vertical spring device can additionally be switched over with respect to a first state and a second state of the vertical spring device at the same time as the locking/unlocking of the rotary device and the horizontal spring device by means of the common switching element to carry out a vertical spring movement of the upper part in relation to the lower part.

6. The vehicle seat according to claim 5, wherein in a locked state of the rotary device and the horizontal spring device, a first vertical suspension state of the vertical spring device with a soft suspension is switched on, and the vertical spring device, in an unlocked state of the rotary device and the horizontal spring device, is switched on a second vertical suspension state, with a hard suspension.

7. The vehicle seat according to claim 1, wherein a seat part side support device for carrying out an upward and downward movement of first side support elements arranged laterally on the seat part can additionally be locked or unlocked by means of the switching element at the same time as the locking/unlocking of the rotary device and the horizontal spring device.

8. The vehicle seat according to claim 7, wherein the seat part side support device in a locked state of the rotary device and the horizontal spring device is in a state with upwardly directed or downwardly directed first side support elements and in an unlocked state of the rotary device and the horizontal spring device is in a state with downwardly directed or upwardly directed first side support elements.

9. The vehicle seat according to claim 1, wherein a backrest side support device to permit a person's movement by side support elements arranged laterally on the backrest can additionally be locked or unlocked by means of the common switching element at the same time as the locking/unlocking of the rotary device and the horizontal spring device.

10. The vehicle seat according to claim 9, wherein the backrest side support device in a locked state of the rotary device and the horizontal spring device is in a state with downwardly directed second support elements and in an unlocked state of the rotary device and the horizontal spring device is in a state with upwardly directed second side support elements.

11. The vehicle seat according to claim 1, wherein a display device, by means of which an indication of an actuation that is due of the switching element can be displayed, can be activated by means of a control device from a predeterminable speed of the vehicle.

* * * * *